UNITED STATES PATENT OFFICE

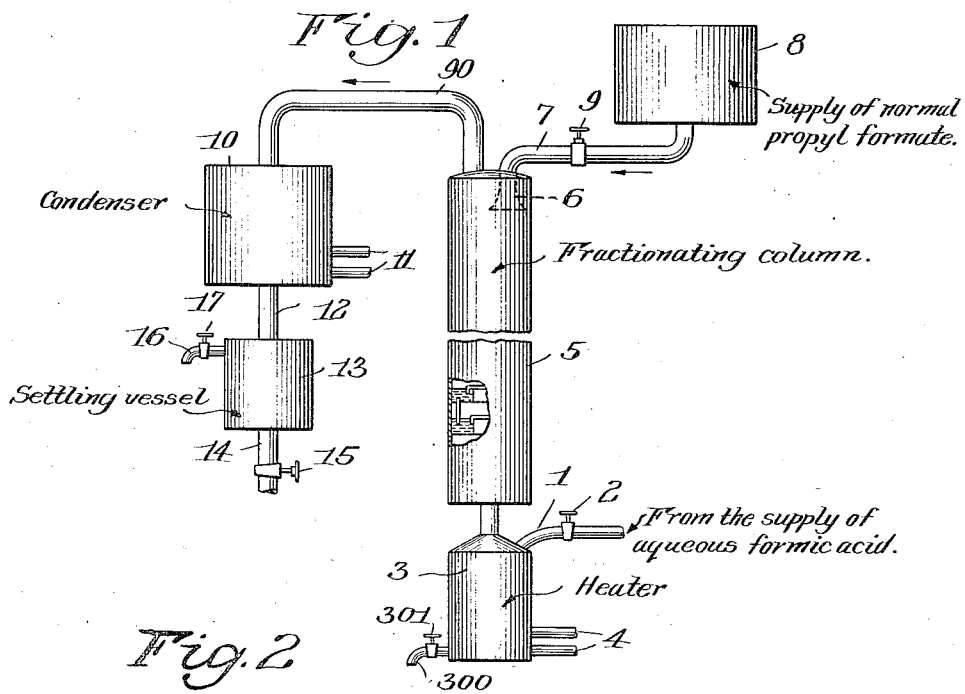
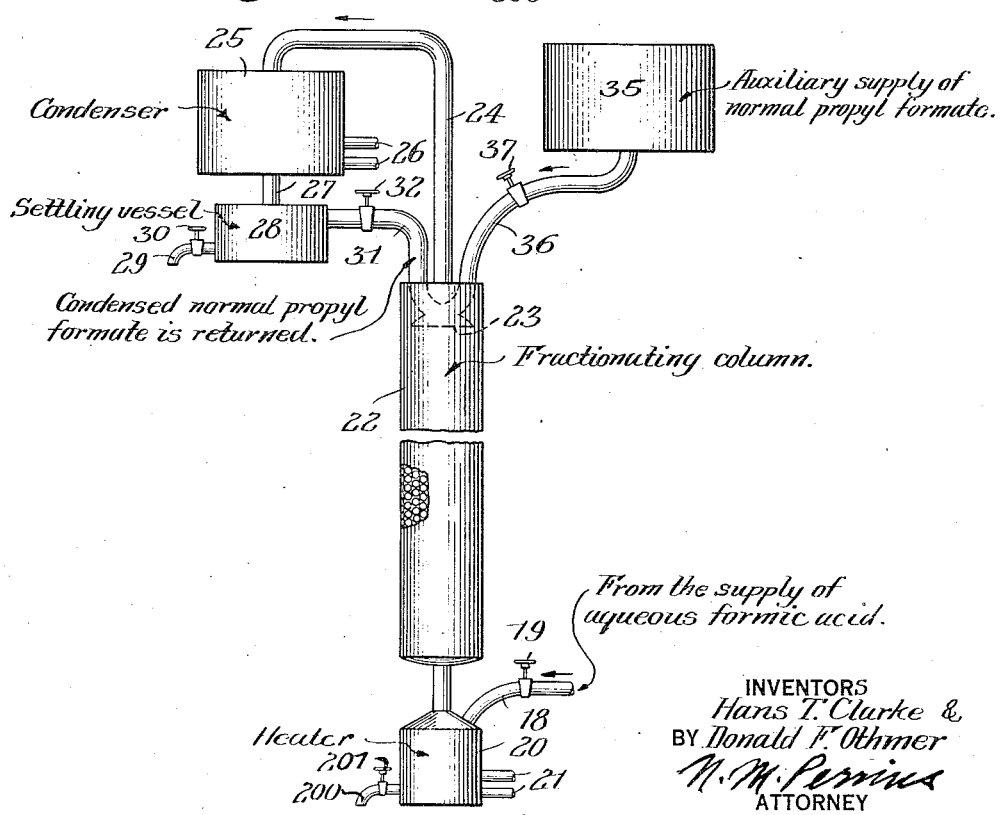

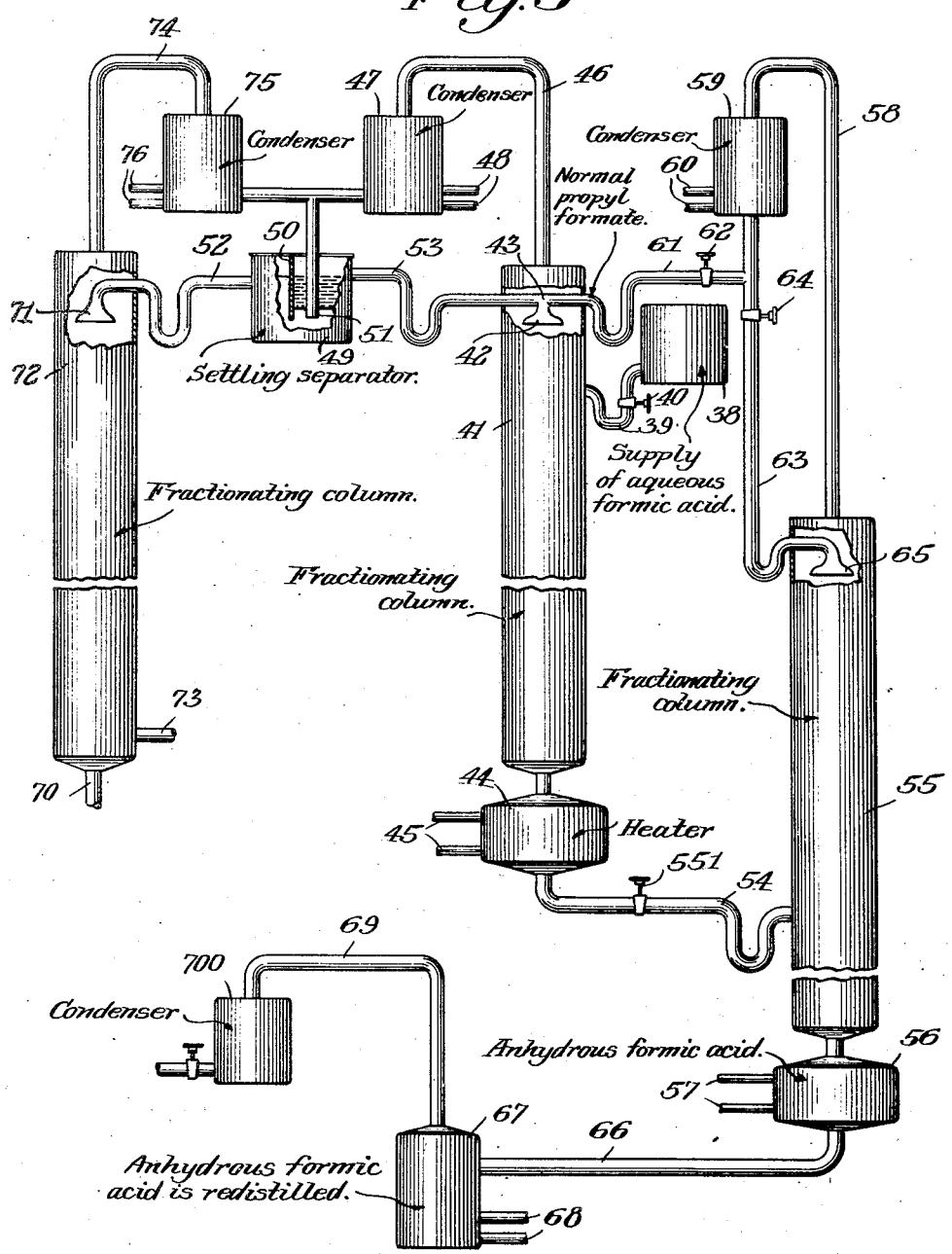

HANS T. CLARKE AND DONALD F. OTHMER, OF ROCHESTER, NEW YORK, ASSIGNORS TO EASTMAN KODAK COMPANY, OF ROCHESTER, NEW YORK, A CORPORATION OF NEW YORK

METHOD FOR THE DEHYDRATION OF FORMIC ACID

Application filed September 8, 1928. Serial No. 304,706.

This invention relates to processes of removing water from aqueous formic acid. One object of the invention is to provide a process that will be simple, inexpensive and yet applicable to acid solutions of any strength, high or low. Another object is to provide a process which will be applicable not only to relatively pure water solutions of formic acid, but also to the production of concentrated formic acid from impure aqueous solutions thereof. A further object is to provide a process in which the water which is finally removed carries away only a very small or negligible amount of formic acid with it. Still another object is to provide such a process in which the amount of heat required is kept as low as possible. A further object is to provide such a process in which the distillation is the main factor without the trouble and cost of initial extraction steps. Another object is to provide a process in which distillation of the aqueous acid is carried out with the aid of an auxiliary organic liquid which combines the essential properties of such an auxiliary in a way not heretofore known. Other objects will hereinafter appear.

In the accompanying drawings,—

Fig. 1 is a diagrammatic side elevation of one form of apparatus in which the process may be carried out, the parts being relatively exaggerated for the sake of clearness;

Fig. 2 is a similar view of another apparatus in which the process may be carried out;

Fig. 3 is a similar view of the preferred apparatus for carrying out the process.

The removal of water wholly or partially from aqueous formic acid is a problem of technical importance. The only published methods for the preparation of anhydrous formic acid from the commercial 90% acid involve immense difficulties, so that it has hitherto been impracticable to produce the anhydrous acid on a commercial scale.

Our process of removing water is primarily a distillation one, in contradistinction to an extraction process. We have found that the hereinbefore mentioned objects and desired results may be obtained by mixing the aqueous formic acid with normal propyl formate, and distilling water and normal propyl formate from the mixture at a temperature below the boiling point of water,—usually more than 18° C. below said boiling point. Preferably extraction agents, especially high-boiling ones, are not present, because they are expensive, troublesome to recover and require too much heat. The process is preferably carried out in a fractionating column of known type, the distilled water and normal propyl formate being condensed, allowed to settle into two layers and the normal propyl formate which forms the upper layer returned to the upper part of the column. In the preferred embodiment of our process the normal propyl formate passes through a cycle without serious loss and can be used over and over again. The bulk of it separates from the water by gravity in the distillate and this layer is reconducted to the upper part of the column.

The first requirements of an auxiliary liquid for use in distilling water from aqueous formic acid are as follows:

1. It must not react with formic acid, nor be decomposed, when boiling with the latter, into impurities which would contaminate the acid.

2. It must be available cheaply in large quantities.

3. It should boil at a lower temperature than formic acid and thus be readily and completely separable from the latter by distillation.

4. It must form a low boiling azeotropic mixture with water.

5. Its miscibility with water should be low.

6. It must cause the concentration of formic acid in the watery layer of the distillate to be always lower than that of the aqueous formic acid which is being concentrated,—such difference in the concentrations being as large as possible.

7. The latent heat of the solvent and the composition of its azeotropic mixtures with water-vapor should be such that the amount of heat required for vaporizing a unit amount of water (in the azeotropic mixture) should be as low as possible.

8. The distribution ratio of formic acid between water and said auxiliary liquid, or in other words, the ratio of formic acid in the water to that in said liquid when the two liquids containing formic acid are in contact (say in superimposed layers) should be low.

We have found that normal propyl formate fulfills all the required conditions. It is a liquid which boils under atmospheric pressure at 81° C., and forms with water a constant boiling mixture containing about 8% of water. The solubility of water in normal propyl formate is low, so that this mixture, when condensed, separates into two layers. The distribution ratio of formic acid between water and normal propyl formate (as compared to other extracting liquids) is relatively high in favor of the normal propyl formate layer, so that the refluxing liquid efficiently removes formic acid from the ascending vapors, while allowing the water to pass upwards in the form of the azeotropic mixture. Its boiling point is sufficiently low to render it possible to separate it without difficulty from anhydrous formic acid by fractional distillation. Likewise, normal propyl formate does not react with formic acid, as would be the case with esters of other acids,—for example, ethyl acetate.

Propyl alcohol may be used instead of N-propyl formate. In this case the propyl formate is formed in the column,—one molecule of propyl alcohol being esterified into one molecule of propyl formate and one molecule of water.

When using a proper fractionating column, there is substantially no acid (less than 1%) in the watery layer of the distillate. Since distillation will not concentrate aqueous acid weaker than the watery layer of the distillate, and since our process in proper apparatus causes virtually no acid in such layer, said process can concentrate aqueous formic acid of any strength,—say from less than 5 to over 99%. Heat economy with normal propyl formate is better than with any of the many auxiliary liquids which we have tested. Let L represent the latent heat of vaporization of the auxiliary liquid, $p$ the number of parts by weight of the latter which distill over with one part of water in the azeotropic mixture, and $Lw$ the latent heat of the vaporization of water. Then,—

$$\frac{L.p}{Lw} = R$$

The value R thus indicates the added amount of heat units required to vaporize in the presence of normal propyl formate, a quantity of water, which, by itself, would be vaporized by a single heat unit. In the case of normal propyl formate, R is only approximately 2.0. Consequently, the heat expense in our process is very low.

A normal propyl formate layer in contact with a watery layer in the distillate will take up a high proportion of the formic acid present. Thus the distribution ratio of acid between water and the liquid is low.

Referring to the accompanying drawings, Figure 1 shows diagrammatically one of the simplest ways in which our invention may be carried out. The aqueous formic acid enters by pipe 1 controlled by valve 2 into the acid heater 3, the latter being heated by a steam jacket or steam coil, in any conventional way, through pipes 4. The vapors from the heated dilute acid enter the fractionating column 5, which may be of any of the well-known types and in this fractionating column meet a downward current or spray of normal propyl formate coming from the nozzle 6, fed through pipe 7 from supply 8, valve 9 controlling the flow. An azeotropic mixture of water vapor and normal propyl formate passes through the pipe 90 into the condenser 10, cooled in any conventional way through pipes 11, and the liquid, thus formed, descends through pipe 12 into settling vessel 13. Here the distillate separates, by gravity, into two layers, the upper one being normal propyl formate, which can be drawn off through pipe 16 controlled by valve 17. This normal propyl formate may then be reintroduced into supply 8. The lower layer is composed chiefly of water, but may contain small amounts of formic acid and normal propyl formate. This can be drawn off through pipe 14 controlled by valve 15. If the amount of normal propyl formate in it is of any consequence, this may be recovered by a flashing and condensing process,—that is, one in which a current of steam is blown through the water and the normal propyl formate thus evolved, is condensed. The liquid, which finally results in vessel 3, will be completely dehydrated. Since an excess of normal propyl formate is used, the liquid in vessel 3 will finally become a dehydrated mixture of normal propyl formate and anhydrous formic acid. This can be withdrawn through pipe 300 controlled by valve 301, and the two ingredients separated by fractional distillation in any usual apparatus, this being easy, because of the difference in boiling point.

Figure 2 shows a further modification in which a major part of the normal propyl formate passes rapidly through a definite cycle. The dilute aqueous formic acid enters through pipe 18, controlled by valve 19, into the heating vessel 20, the latter being supplied with the necessary heating fluids for its jacket or coils through pipes 21. The ascending vapors in the fractionating column 22, of known type, meet a descending spray or stream of normal propyl formate coming from nozzle or opening 23. The azeotropic vapor mixture of water and normal propyl formate passes through pipe 24 into condenser 25, which receives its supply of cooling liquid through pipes 26. From this condenser it flows through pipe 27 into the gravity settling vessel 28. The lower layer of water is withdrawn through pipe 29 controlled by valve 30 and the upper layer of normal propyl formate is conducted back to nozzle 23 from the gravity settling vessel 28 through pipe 31, controlled by valve 32. Also, there is an auxiliary supply 35 of normal propyl formate from which the latter may be conducted through the nozzle 23 through pipe 36 controlled by valve 37. This supply is merely to compensate for any losses which take place during the regular cycle of normal propyl formate through parts 24, 25, 27, 28, 31 and 23. The water, which is drawn off through pipe 29, can be thrown away, or any normal propyl formate recovered therefrom by means described under Figure 1. The dehydrated mixture of normal propyl formate and anhydrous formic acid is drawn off from the heater 20 through pipe 200, controlled by valve 201, and then fractionated to separate the ingredients, as will be obvious.

Figure 3 shows diagrammatically the preferred apparatus for carrying out our invention. The supply tank of aqueous formic acid 38 is connected by pipe 39 controlled by valve 40 with an intermediate portion (say about one-half of the way up) of the fractionating column 41 of one of the usual types. At the top of this column a downward current or spray of normal propyl formate enters from nozzle or opening 42, which is connected with the horizontal transverse pipe 43. The base of the column is provided with the customary heating vessel 44, the heating fluid from which comes through pipes 45. The azeotropic mixture of the vapors of water and normal propyl formate leaves the top of the column into pipe 46 and from thence enters condenser 47, the cooling fluid of which circulates through pipes 48. The condensate from 47 flows down into the settling chamber 49, the latter being provided with a downwardly extending transverse partition 50, which is separated, however, from the bottom of the vessel. The pipe 51 from the condenser 47 likewise extends well down into the vessel 49. When the distillate reaches vessel 49, it separates into two layers, the normal propyl formate layer being uppermost and confined at one side of the partition 50, as shown in the drawings. From the vessel 49 the watery layer passes beneath the partition 50 and then through the exit pipe 52 to further treating apparatus which will be described hereinafter. The upper layer of normal propyl formate passes out through pipe 53 to pipe 43 and thence downwardly through the nozzle 42 into the fractionating column 41. Thus the bulk of the normal propyl formate passes through a cycle from the nozzle 42 to column 41 and thence through the following parts, 46, 47, 51, 49, 53 and 43.

Some normal propyl formate will collect with the dehydrated or anhydrous formic acid in the heating vessel 44. This dehydrated mixture is then conducted through pipe 54 controlled by valve 551 to an intermediate portion of an auxiliary fractionating column 55 of one of the known types. The heating for this column 55 is done in the chamber 56, the heating fluid for which circulates through pipes 57. Vapors of normal propyl formate pass from the top of the column through pipe 58 to condenser 59, the cooling fluid of which circulates through pipes 60. This condensed normal propyl formate can be passed partly through pipe 61 controlled by valve 62 into pipe 43 and nozzle 42 of the main fractionating column, and partly through pipe 63 controlled by valve 64 into the nozzle or opening 65 at the top of column 55, and there to act as a refluxing liquid.

The anhydrous formic acid in vessel 56 is conducted through pipe 66 to a simple still 67, the heating fluid for which circulates through pipes 68. The vapors of formic acid pass over through pipe 69 into the final condenser 700 from which the anhydrous formic acid can be drawn off and stored. The distillation in still 67 is not indispensable, but is preferable if an anhydrous formic acid of high purity is desired.

Referring to the upper left-hand part of Figure 3, the watery layer from the settling vessel 49 passes through pipe 52 to the nozzle or opening 71 at the top of fractionating column 72, the latter being of any of the usual types. Steam is blown into the column through pipe 73 and hot water passes to waste through pipe 70, preferably to a heat interchanger, not shown. The passage of the steam up the column 72 volatilizes the small amount of normal propyl formate which is present in the water material descending from nozzle 71. The vapors of normal propyl formate pass through pipe 74 into condenser 75, the cooling fluid of which circulates through pipes 76. The normal propyl formate from 75 passes through pipe 51 to the top or upper layer of the settling vessel 49 and thence returns to the normal circulatory path of the normal propyl formate through pipes 53 and 43 and nozzle 42.

It will be understood that in all forms of apparatus the customary precautions for preventing heat losses by suitable insulation are observed, and the parts which contact with the acid are made of resistant materials customarily employed for that purpose. Furthermore, the process is preferably operated under atmospheric pressure conditions, although it can be conducted with the system at superatmospheric pressure or subatmospheric pressure. When we refer herein to the boiling points of the ingredients and mixtures, such, for instance, as the boiling point of water, we refer to those under the particular pressure conditions that are employed,—normally atmospheric.

We will now describe two discontinuous methods of carrying out our process, but it will be understood that we will not be limited thereby except as indicated in the appended claims.

*Example I.*—Three parts of 90% formic acid are mixed with one part of normal propyl formate and distilled through a suitable fractionating column. The vapor issuing at the head of the column is condensed and passed through an automatic separator. The upper layer is returned to the head of the column, while the lower layer is allowed to flow away. This lower layer consists almost entirely of water and contains, when the operation is properly carried out, less than 1% of its weight of formic acid and a small quantity of dissolved propyl formate, which may be recovered by known means. The temperature at the head of the column remains at 76°. When water ceases to come off the residual mixture is fractionally distilled, when approximately 90% of the formic acid originally present is obtained as a distillate passing over at 99.0–99.2° C. under atmospheric pressure which distillate is substantially anhydrous formic acid.

*Example II.*—A mixture of 8 parts of 90% formic acid and 3 parts of normal propyl alcohol is distilled in a suitable column as in Example I. The propyl alcohol is esterified by the action of the acid, yielding propyl formate, and the process is then analogous to Example I. After passing through the rectifying column, the distillate is condensed and 1.7 parts of water containing less than 1% of its weight of formic acid separates from the propyl formate layer. The water being thus removed from the system, the distillation is continued in order to separate the propyl formate and anhydrous formic acid. An intermediate fraction containing 4.5 parts of normal propyl formate and 1 part of anhydrous formic acid is obtained, after which 3.5 parts of anhydrous formic acid is recovered which is substantially pure and boils at 99.0–99.2° C. The normal propyl formate so obtained may be employed for the dehydration of further quantities of 90% formic acid, as for instance, in accordance with Example I.

In this specification and in the claims appended hereto, where reference is made to a distillation temperature which is below the boiling point of water, it will be understood that such boiling point is one that is determined at the pressure at which the distillation is being conducted. Thus, if the distillation is carried out at sub-atmospheric or super-atmospheric pressure, the boiling point of water referred to would be determined as of that pressure. The boiling point of the distillate itself or any fraction thereof is determined, as usual, at atmospheric pressure.

Having thus described our invention, what we claim as new and desire to secure by Letters Patent is:

1. In the process of removing water from aqueous formic acids the steps of mixing therewith normal propyl formate and distilling water and normal propyl formate from the mixture at a temperature below the boiling point of water.

2. In the process of removing water from aqueous formic acid the steps of mixing therewith normal propyl formate and distilling water and normal propyl formate from said mixture, the latter being substantially free from solvents of formic acid that have a higher boiling point than said acid.

3. In the process of removing water from aqueous formic acid the steps of mixing therewith normal propyl formate, distilling off the water with part of the normal propyl formate and separating the dehydrated formic acid from the remaining normal propyl formate, said distillation being conducted at a temperature below the boiling point of water.

4. In the process of removing water from aqueous formic acid the steps of mixing therewith normal propyl formate, distilling the mixture at a temperature below the boiling point of water to evolve a constant boiling mixture of water and normal propyl formate, condensing the latter mixture and whatever acid comes over with it, allowing it to settle in two layers, and returning the upper layer to the original mixture undergoing distillation.

5. In the process of removing water from aqueous formic acid the steps of supplying said acid to a distilling column, during distillation therein adding normal propyl formate at the upper part of the column, and removing from the top of the column a constant boiling mixture of water and normal propyl formate at a temperature below the boiling point of water.

6. In the process of removing water from aqueous formic acid the steps of supplying said acid to an intermediate part of a distilling column, during distillation therein adding normal propyl formate at the upper part of said column, removing from the top of the column a constant boiling mixture of water and normal propyl formate, condensing the latter mixture and whatever acid comes over with it, allowing it to settle in two layers, returning the upper layer to the top of the column and withdrawing a mixture of dehydrated formic acid and normal propyl formate from the lower part of the column, and separating the former from the latter, the total weight of the normal propyl formate added to the upper part of the column per unit time being not less than 12½ times the weight of water distilled from the top of the column per unit time, and the temperature at which said constant boiling mixture is removed being below 80° C.

7. In the process of removing water from aqueous formic acid, the steps of mixing normal propyl alcohol therewith to form normal propyl formate with part of said acid and distilling a constant boiling mixture of water and normal propyl formate from the mixture at a temperature below the boiling point of water.

8. In the process of removing water from aqueous formic acid, the steps of mixing normal propyl alcohol therewith to form with a part of said acid an excess of normal propyl formate with respect to the water present in the system, distilling a constant boiling mixture of water and normal propyl formate from the mixture at a temperature below the boiling point of water, and separating the dehydrated formic acid from the normal propyl formate remaining in the mixture.

9. In the process of removing water from aqueous formic acid, the steps of supplying said acid to an intermediate part of a distilling column, during distillation therein adding normal propyl alcohol at the upper part of said column to form with a part of said acid an excess of normal propyl formate with respect to the water present in the system, removing in vapor form from the top of the column a constant boiling mixture of water and normal propyl formate at a temperature below the boiling point of water, condensing the vapor and whatever acid comes over with it, allowing it to settle into two layers, returning the upper layer to the top of the column, and withdrawing a mixture of dehydrated formic acid and normal propyl formate from the lower part of the column, and separating the dehydrated acid from the normal propyl formate.

Signed at Rochester, New York, this 4th day of September, 1928.

HANS T. CLARKE.
D. F. OTHMER.